Figure 8:
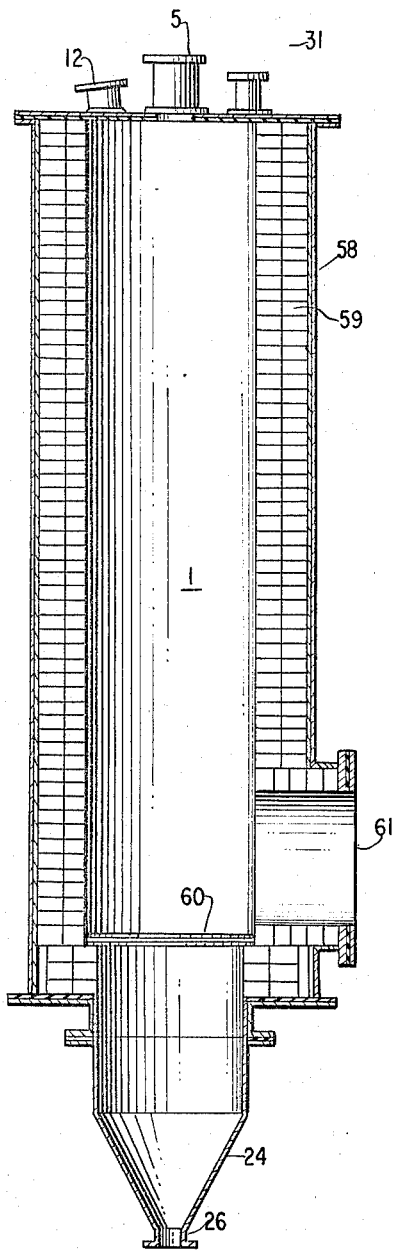

Nov. 8, 1966  G. L. HELLER ETAL  3,284,167
APPARATUS FOR PRODUCING PIGMENTARY SILICA
Original Filed May 29, 1961  3 Sheets-Sheet 1
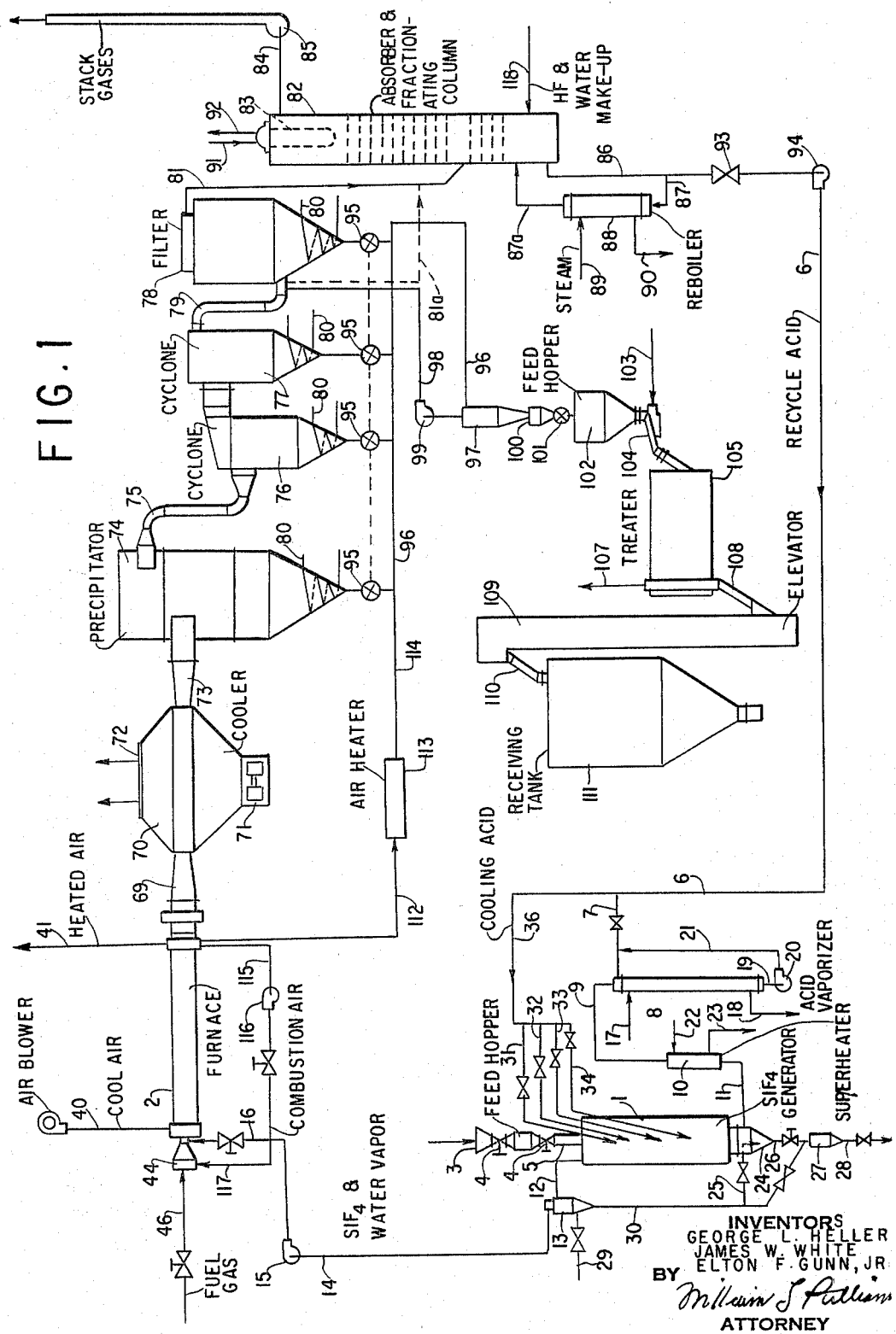

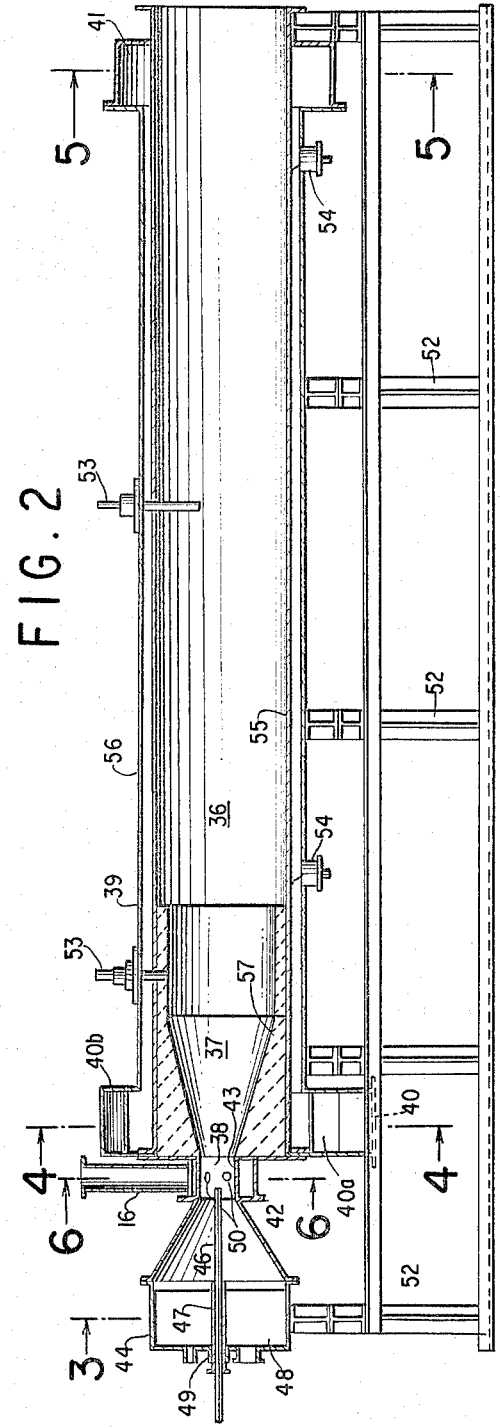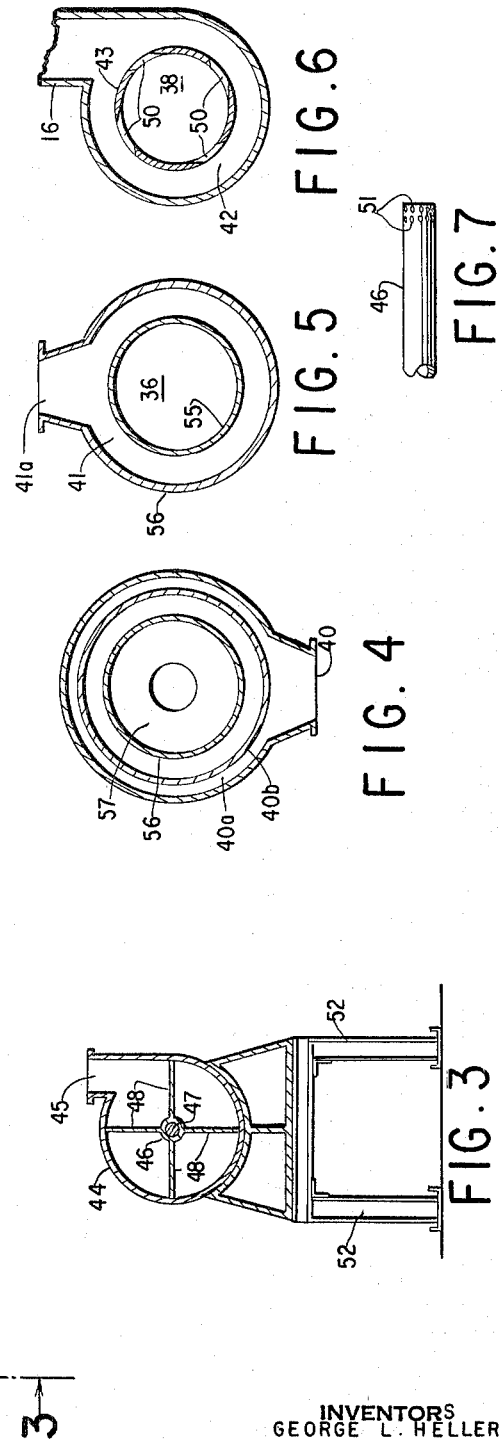

Nov. 8, 1966  G. L. HELLER ETAL  3,284,167
APPARATUS FOR PRODUCING PIGMENTARY SILICA
Original Filed May 29, 1961  3 Sheets-Sheet 3

INVENTORS
GEORGE L. HELLER
JAMES W. WHITE
ELTON F. GUNN, JR
BY William S Pallian
ATTORNEY 3,284,167
APPARATUS FOR PRODUCING
PIGMENTARY SILICA
George L. Heller, James W. White, and Elton F. Gunn, Jr., all of Monroe, La., assignors to CBN Corporation, a corporation of Delaware
Original application May 29, 1961, Ser. No. 113,270, now Patent No. 3,233,969, dated Feb. 8, 1966. Divided and this application June 1, 1965, Ser. No. 475,620
4 Claims. (Cl. 23—262)

This application is a division of our co-pending application, Ser. No. 113,270, filed May 29, 1961, which issued as U.S. Patent 3,233,969 on February 8, 1966.

The present invention relates to pigmentary silica and provides an improved pigmentary amorphous silica having properties by which it is especially adapted for use as a pigment and as a reinforcing agent in rubber compositions and the like, including exceptionally high oil absorption characteristics, and which imparts to rubber compositions exceptionally high tensile strength. The invention also provides improved methods and apparatus especially adapted to the economical production of the improved pigmentary silica.

The process to which the invention relates is of the general type involving the steps of generating silicon tetrafluoride by reacting hydrofluoric acid with a siliceous material, and hydrolyzing the resultant silicon tetrafluoride to precipitate pigmentary silica in gaseous suspension. The basic chemical reactions involved are well-known to the art, namely:

(1)   $SiO_2$ (crystalline) $+4HF \rightarrow SiF_4+2H_2O$
(2)   $SiF_4+2H_2O \rightarrow 4HF+SiO_2$ (amorphous)

Extensive research has been carried on in an effort to develop an economical, commercial process capable of producing pigmentary amorphous silica of high grade to meet the large and growing demand for extremely finely-divided, light-colored pigments and rubber reinforcing agents.

It has been known, for instance, that silicon tetrafluoride can be generated by reacting sulfuric acid with siliceous fluorspar. It has also been known that by digesting aqueous hydrofluoric acid with siliceous fluorspar at room temperature, hydrofluosilicic acid is formed which may be decomposed to silicon tetrafluoride, hydrofluoric acid and water vapor by heating. It has further been known that silicon tetrafluoride can be generated directly by reacting hydrofluoric acid with silica sand in the absence of water.

It has likewise been known that a finely-divided silica may be formed by reacting silicon tetrafluoride with steam or by otherwise hydrolyzing the $SiF_4$ in vapor phase at an elevated temperature, or by burning a combustible silicon compound.

To our knowledge, none of these proposals has been found to be commercially feasible and economically attractive.

More recently, it has been proposed to generate silicon tetrafluoride by passing hydrofluoric acid vapor through a suspension of silica sand in glycerin or other polyhydric alcohol, the suspension being maintained at a temperature within the range of 250° to 350° F. However, this operation has entailed the expense of the suspension medium and maintaining the sand in suspension therein by agitation.

In spite of many attempts to utilize the previously noted chemical reactions, represented by Equations 1 and 2, in the production of finely-divided silica, to the best of our knowledge, no commercial process for the manufacture of pigmentary silica by that method has heretofore been available. The difficulties with the previously proposed processes have been due largely to low yield and high cost of operation, more particularly, either a low yield of the silicon tetrafluoride or a low yield of pigmentary silica from the silica tetrafluoride or the prohibitive cost of reclaiming the hydrofluoric acid or a combination of these faults. Continuous, uniform operation, whereby a pigmentary silica of uniform quality and high purity can be economically produced, has not heretofore been attained.

Hydrofluoric acid is a relatively expensive reagent and therefore operations of the present type have not been found economically feasible for the production of pigmentary silica unless the hydrofluoric acid released by the hydrolysis of the silicon tetrafluoride can be economically recovered in a form suitable for repeated use.

Such recovery has heretofore been complicated by the facts that the hydrofluoric acid has been separated from the tail gases as extremely dilute aqueous solutions and the recovery of concentrated hydrofluoric acid from these dilute solutions has been difficult and very costly.

We have discovered, most surprisingly, that by careful coordination of temperature and concentration, the gaseous mixture obtained by vaporizing relatively dilute aqueous solutions of hydrofluoric acid may be caused to react directly with a bed of crystalline silica, such as siliceous sand or gravel or other coarse particles, producing amazingly high yields of silicon tetrafluoride.

For this purpose, the concentration of the hydrofluoric acid in the water vapor mixture passed in contact with the bed of crystalline silica must be within the range from about 30% to about 40%, by weight, and the bed of siliceous material and reactant HF must be maintained at a temperature in excess of the boiling point of water, preferably not lower than 250° F., but not in excess of about 430° F. For most efficient generation of the $SiF_4$, the reaction temperature should be uniformly maintained within the range of 250°–370° F. At lower temperatures, there is a danger of condensation and at temperatures above 370° F. there is a surprisingly rapid decrease in the yield of $SiF_4$. By maintaining the bed at a uniform temperature within the range of 250°–350° F., a better than 95% conversion of the HF to $SiF_4$ has been obtained in a 15-second contact time.

The rate of flow of the gaseous mixture through the bed of crystalline siliceous material is subject to considerable variation depending primarily upon the gas and bed temperature, uniformity of the gas distribution and fineness of the crystalline silica composing the bed. But we have found in pilot plant operation, at bed temperatures within the preferred range, that for optimum results, i.e., substantially complete reaction of the hydrofluoric acid with silica gravel, the gaseous mixture should be passed through the bed at a rate equivalent to about 0.5 pound of hydrofluoric acid per minute per cubic foot of the gravel. Using a bed composed of crystalline quartz of larger particle size, e.g., approximately one inch maximum dimension, a contact time of about 15 seconds has been found highly effective and efficient.

Crystalline silica occurs plentifully in nature in three primary forms, namely, quartz, tridymite and cristobalite. Crystalline silica in any of these forms, or mixtures thereof, may be used in accordance with the present invention. However, quartz is most abundant and has been found to have outstanding practical advantages. It is composed of hexagonal-shaped crystals having a refractive index of 1.442 and a specific gravity of 2.65 and is available in highly pure form. Best results have been obtained using quartz crystals of approximately 99% pure $SiO_2$ and a particle size of approximately one inch, maximum dimension, though particle size is not a critical aspect of the present invention.

Crystalline silica of the particle size just noted has the advantage of minimizing the tendency of the gaseous mixture to channel through the bed, thus promoting more uniform contact between the gas and the solid. More finely-divided crystalline silica, e.g., quartz sand, may be used, as indicated above, but the percent conversion of the HF to $SiF_4$ is apt to be reduced somewhat, unless special means is provided to assure a substantially uniform flow of the gaseous medium through the bed.

This invention and the practical application thereof are especially valuable since the recovery of aqueous hydrofluoric acid at these relatively low concentrations from the effluent gases resulting from the hydrolysis reaction presents a minimum of economic and practical difficulty, as hereinafter more fully described.

The silicon tetrafluoride, as generated by the method just described, will contain an unusually high proportion of water vapor, due to the presence of a large amount of water vapor in the HF reactant, but the proportions of $SiF_4$ and water vapor, constituting the generator effluent gases, will remain substantially constant, so long as the temperature, concentration and rate of flow of the hydrofluoric acid reactant to and through the silica bed and the temperature and composition of the silica bed remain constant.

This large excess of water vapor in the silicon tetrafluoride mixture subjected to the hydrolysis reaction of Equation 2 has been found to contribute markedly to the quality and uniformity of the pigmentary silica product, particularly where the hydrolysis is effected as hereinafter described.

Though the $SiF_4$ generation step, just described, is of general utility, not restricted as to the manner in which the hydrolysis is effected, we have found the silicon tetrafluoride-water vapor mixture resulting from our present method of generating the silicon tetrafluoride, to be especially effective where the silicon tetrafluoride-water vapor mixture passing from the generator is first uniformly, thoroughly dispersed in a stream of preheated air, or similar free oxygen-containing gas, under conditions of extreme turbulence, and the resultant mixture, still in a state of extreme turbulence, is thoroughly mixed with a stream of fuel gas prior to subjecting it to the hydrolysis. Immediately thereafter, this final mixture is charged into the combustion zone of a highly-heated furnace chamber, in which the fuel gas is burned by combining with the air, both of which having been thoroughly premixed with the $SiF_4$ and water vapor. As an alternative, the air and fuel gas may be simultaneously mixed with the $SiF_4$-water vapor mixture from the $SiF_4$ generator. It is important, however, that the temperature of the $SiF_4$-water vapor mixture be maintained sufficiently high at all times to prevent condensation of the water.

By this method of hydrolysis, the silica is precipitated in gaseous suspension in a uniform, extremely finely-divided, amorphous state having a mean particle diameter ranging from 10 to 20 millimicrons and extraordinarily high oil absorption characteristics within the range from about 25 to about 50 gallons of oil per hundred pounds of the silica, as determined by the Gardner method. We have found that where the step of premixing with air and fuel is not employed, the oil absorption value of the resultant silica is of a much lower order, usually ranging from about 7 gallons to about 8 gallons of oil per hundred pounds of the silica.

Our improved amorphous silica is further characterized by a bright white color, becoming translucent when dispersed in liquid, an uncompressed bulk density of about 1 pound to about 5 pounds per cubic foot and stability in the presence of atmospheric moisture. Its surface area, as determined by the nitrogen absorption method, ranges from about 120 to about 220 square meters per gram, analyzes at least 99% $SiO_2$ and has a specific gravity slightly in excess of 2.

It is to be emphasized that, in accordance with our improved hydrolysis method, the silicon tetrafluoride-water vapor mixture is premixed with the air and fuel gas prior to introducing it into the flame zone of the hydrolysis chamber, as distinguished from previous proposals of effecting the mixing in the flame zone.

A further serious difficulty encountered in prior efforts to hydrolyze silicon tetrafluoride to form pigmentary silica has been the deposition of silica on the chamber walls, resulting in the plugging-off of the hydrolysis chamber and also interfering with the gas flow and mixing pattern which deleteriously affects uniformity and quality of the resulting silica. We have discovered that these difficulties can be avoided by preventing the temperature of the wall of the hydrolysis chamber, and particularly the wall surrounding the combustion and other highly-heated zones of said chamber, from exceeding about 1200° F., preferably below that temperature.

The required low wall temperature can be maintained by maintaining the velocity of the gases passing to the combustion zone of the reactor in excess of the velocity of the flame propagation. However, a preferable, more readily controllable, method for accomplishing this purpose is by providing a cooling jacket surrounding the outer wall of the reactor and passing a cooling fluid, for instance air, through the jacket, as more fully hereinafter described.

In addition to the suspended silica, the effluent gases from the hydrolysis reactor will contain hydrogen fluoride and a large amount of water vapor, and also the gaseous products of combustion of the fuel gas. As previously noted, it is an economical necessity that the hydrogen fluoride be recovered in a form in which it can be recycled for reuse in the generation of $SiF_4$.

By reason of that aspect of the present invention, in accordance with which a relatively dilute aqueous solution of HF may be used, the recovery of the hydrogen fluoride from the tail gases in a state suitable for reuse may be readily effected by known fractional condensation methods applied to the effluent gases from the hydrolysis reactor subsequent to the separation of the suspended silica therefrom, as hereinafter illustrated.

It is important, however, that the separation of the suspended pigmentary silica from the reactor effluent gases may be effected under conditions such as to prevent, or at least minimize, a reversal of the reaction, i.e., reaction of the suspended silica with the liberated acid. To this end, the suspension, and the confining surfaces with which it comes in contact, should preferably be maintained at a temperature as near the gas temperature as reasonably possible. Furthermore, if the surface temperature is low enough for condensation of the water vapor to occur, rapid corrosion of the metal surfaces will result. As a precaution against such condensation and reversal of the reaction, it is recommended that the temperature be maintained at least 500° F., up to the point where the silica is separated and recovered from the gaseous suspension.

The separation and recovery of the finely-divided silica from the reactor effluent gases may be effected in various ways, provided the condensation of water vapor is avoided. We have, with particular advantage, effected the separation by means of conventional cyclone separators preceded by an electrical precipitator and, if desired, followed by a bag filter, as well-known in the art of recovering pigments, for instance, carbon black, from gaseous suspension. Where this method of separation and recovery is employed, it is sometimes desirable to reduce the temperature of the suspension to about 800° F. before passing it to the electrical precipitator. However, temperatures of about 1300° F. may frequently be used with advantage.

It has been found that where this method of separation is employed, the separated silica may contain a substantial amount, for instance about 2%, of absorbed or adsorbed HF, which is objectionable with respect to the quality and stability of the amorphous silica in some applications. This objectionable HF is, with advantage, expelled by heating the separated and collected silica to a temperature of 500°–1500° F. This residual HF expelled from the amorphous silica may be returned to the hydrogen fluoride cycle. By heating to about 1300° F. for about 15 minutes, the residual HF may be reduced to below 0.1%.

Accordingly, it will be seen that the invention provides a unitary commercial process and apparatus for the production of an improved pigmentary amorphous silica, of exceptionally high quality, and which is capable of economical, continuous, trouble-free operation.

In one of its aspects, the invention provides an improved step of generating silicon tetrafluoride, whereby the reaction of Equation 1 is effected at surprisingly high efficiency and economy and at an unexpectedly high reaction rate under the prescribed conditions.

In a further aspect, the invention povides for the efficient recovery of the hydrofluoric acid fom the tail gases resulting from the reaction of Equation 2 in a state in which it may be effectively and economically recycled for reuse in reacting with additional crystalline silica for the generation of silicon tetrafluoride.

In another aspect, the invention provides an improved method of hydrolyzing the SiF$_4$-water vapor mixture passing from the SiF$_4$ generator whereby the quality of the resultant amorphous silica is vastly improved.

In a still further aspect, the invention provides improvements whereby previously experienced difficulties due to deposition of silica on the walls of the hydrolysis chamber are entirely avoided, thus providing continuous, uniform operation, without periodic interruption due to plugging-off of the hydrolyzing chamber.

Other advantages accruing from the present invention will appear from the following more detailed description thereof with reference to the accompanying drawings which represent apparatus especially adapted to the carrying out of the several steps of the process which cooperate in the manner described. It will be understood, however, that the invention is not restricted to the particular embodiment thereof illustrated in the drawings.

FIG. 1 of the drawings diagrammatically and conventionally represents a flow sheet of a complete operation embodying the presently preferred cooperating steps of the process of our invention.

Figure 9:
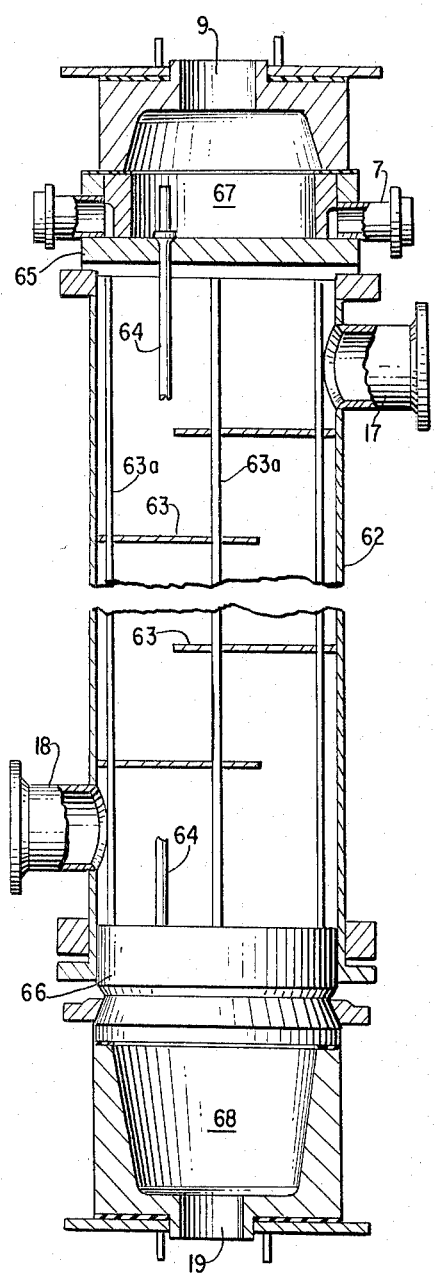

FIG. 2 is a longitudinal, sectional view of an hydrolysis reactor unit in which the hydrolysis of the SiF$_4$ is effected, FIG. 3 is a transverse sectional view along the line 3—3 of FIG. 2, FIG. 4 is a transverse sectional view along the line 4—4 of FIG. 2, FIG. 5 is a transverse sectional view along the line 5—5 of FIG. 2, FIG. 6 is a transverse sectional view along line 6—6 of FIG. 2, FIG. 7 is a somewhat enlarged longitudinal view of the fuel gas injector, FIG. 8 is an enlarged, vertical sectional view of the SiF$_4$ generator, and FIG. 9 is an enlarged, vertical sectional view of commercially available apparatus especially suitable for use as the acid vaporizer.

Referring particularly to FIG. 1, the SiF$_4$ generator is represented at 1 and the hydrolyzing unit is represented at 2. Crystalline silica is charged to the generator 1 through feed hopper 3, equipped with gas locks 4 of conventional type, adapted to prevent escape of gases during charging, and conduit 5.

Recycled acid is passed through line 6 and valved connection 7 into the upper end of acid vaporizer 8, of a type more fully illustrated in FIG. 9. The aqueous acid solution is vaporized as it passes downward through vaporizer 8 and the resultant mixture of HF and water vapor is passed from the vaporizer through line 9 to superheater 10, wherein the gaseous mixture is heated to the desired temperature, preferably within the range of 250° to 370° F., and is then passed directly into the lower end of the SiF$_4$ generator 1 through line 11 and passes upwardly through the generator in contact with the bed of crystalline silica, whereby the HF is substantially completely converted to silicon tetrafluoride and water vapor.

The mixture of SiF$_4$ and water vapor passes from generator 1 through line 12 to separator 13, adapted to separate any solid particles from the gaseous mixture, and advantageously of the cyclone type. The gaseous mixture, free from solid particles, passes from the separator through line 14 to blower 15 by which the vapor mixture is charged through valved line 16 to the hydrolyzing unit 2. In passing from generator 1 to hydolyzing unit 2, the temperature of the vapor mixture should be maintained sufficiently high to prevent condensation.

Heat required for vaporizing the aqueous acid solution is, with advantage, supplied by passing steam to the vaporizer 8 through line 17, in indirect heat exchange with the acid solution, and discharging the condensate through line 18. For this purpose, we have, with advantage, used steam at a pressure of 50 p.s.i.g. at 298° F. Effluent acid vapors will usually be at a temperature of about 235° F.

Any unvaporized acid solution is withdrawn from the lower end of the vaporizer through line 19 and is returned to the upper end of the vaporizer by means of pump 20 and connection 21.

Superheater 10 is of the indirect heat exchanger type and is, with advantage, heated by steam at a pressure of 100 p.s.i.g. introduced through line 22, the exhaust steam being withdrawn through line 23.

When crystalline silica of high purity is used, a relatively small amount of residual solids will result from the SiF$_4$ generation reaction. Such residual material as remains will be in finely-divided form and will settle to the lower end of the SiF$_4$ generator and collect in the cone-shaped hopper 24 from which it is flushed from time to time by water, introduced through valved connection 25, through valved connection 26 into the waste tank 27, from which it may be discharged as required through valved connection 28. Similarly, any solids separated from the generator effluent gases may be flushed from the separator 13, by means of water introduced through valved connection 29, through valved line 30 into the waste tank 27.

As we have previously noted, the temperature of the crystalline silica bed in the SiF$_4$ generator 1 must be carefully controlled and regulated within the previously-indicated range. Since the reaction represented by Equation 1 is exothermic, suitable means should be provided for dissipating heat from the crystalline silica bed. Various known expedients may be used for this purpose; for instance, one may obtain especially satisfactory results by introducing, directly into the crystalline silica bed, a relatively minor proportion of the recycled acid in liquid phase, thus extracting heat from the silica bed by vaporization of the aqueous acid.

This method of dissipating heat from the crystalline bed is especially effective since the temperature in the various zones of the crystalline bed can be controlled and regulated to provide a uniform, predetermined temperature throughout, thus markedly improving the efficiency of the reaction.

In a preferred aspect of the invention, thermocouples, or other temperature measuring devices, are provided at intervals over the height of the crystalline bed and means are provided for introducing the aqueous acid directly into the respective zones, for instance as illustrated in the drawing through the respective valve connections 31, 32, 33 and 34 connected through line 35 to the recycle acid line 6.

As more clearly shown in FIGS. 2, 3, 4, 5 and 6 of the drawing, the hydrolyzing unit comprises an elongated, unobstructed furnace chamber 36 of circular cross-section connected through tapered section 37 to a confined throat section 38. The chamber 36, as shown in the drawing, excepting the refractory lining at its upstream end, is of substantially uniform diameter throughout its length, and section 37 is generally cone-shaped. Though this furnace design has been found especially advantageous, it does not appear to be critical and furnaces of different cross-sectional configuration may be used.

For reasons previously described herein, chambers 36 and 37 are surrounded throughout their length by cooling jacket 39 to which cool air is supplied through inlet 40, air bustle 40a and the perforations of distributing baffle 40b at the upstream end of the furnace and from which hot air is discharged through air bustle 41 and outlet 41a positioned at the downstream end of the furnace chamber.

The throat 38 is surrounded by annular chamber 42 into which the $SiF_4$-water vapor mixture from the generator 1 is introduced tangentially under pressure through line 16. The inner wall 43 forming throat 38 is perforated at 50 to permit the passing of the $SiF_4$-water vapor mixture from chamber 42 into the throat 38, as more clearly shown in FIG. 6.

Further upstream from the throat 38, there is provided an air chamber 44, of generally circular cross-section and tapering toward throat 38, to which air is introduced tangentially under pressure through air inlet 45. Extending coaxially through the air chamber and terminating in the throat 38, there is provided a fuel gas injector 46, extending through sleeve 47 in which the tube 46 is free to move backward and forward to adjust the position of its inner end. Sleeve 47 is supported at its inner end by cross-rods 48 and is supported and sealed at its outer end by packing gland 49.

In operation, air, preferably preheated, is charged under pressure and at high velocity into the air chamber 44 so as to develop therein a swirling cyclone gradually diminishing in diameter and increasing in velocity as it approaches throat 38 wherein it becomes thoroughly mixed with the $SiF_4$-water vapor mixture charged into the throat 38 through line 16 and openings 50, also in a substantially tangential direction.

The fuel gas injector 46 is, with advantage, closed at its inner end and provided, in close proximity to its inner end, with a single row or a plurality of rows of radially-extending outlets 51 so that the fuel gas supplied thereto under pressure is jetted radially outwardly through the perforations 51 into the swirling stream of the $SiF_4$-water vapor-air mixture and is uniformly mixed therewith prior to entering the flame zone of the furnace chamber.

The velocity of this gaseous mixture flowing inwardly through the furnace throat is maintained in excess of the velocity of the flame propagation so that the flame front of the combustion, or flame, zone is mainained just downstream from the throat exist. In the flame zone, temperatures within the range of 1400° to 3000° F. are maintained, preferably within the range from 2400° to 2600° F. This temperature can be controlled by regulation of the proportion of fuel gas and air injected. The proportion of air injected should be such as to produce a clean, oxidizing blast flame, but may be varied over a considerable range depending upon the desired properties of the pigmentary silica product. The proportion of $SiF_4$ may also be varied over a considerable range depending upon the desired quality of the product. The fineness of the resultant silica has been found to increase as dilution of the reactants is increased, apparently due to a lessening of particle size growth of the fume silica while in the flame zone.

We have, with particular advantage, used as the fuel gas a manufactured gas of 470 B.t.u. per cubic foot. But most any clean-burning fuels such as methane, butane or fuel oil may be used as the source of heat required to effect the hydrolysis. The position of the fuel jets should be adjusted to give a stable flame just downstream from the throat section 38. Also, care should be taken to prevent the furnace outlet temperature from exceeding about 1800° F. to avoid damaging other equipment downsteram.

Referring more particularly to FIG. 2, the hydrolysis unit may be supported in any suitable fashion by means of a foundation or piers such, for instance, as indicated at 52. The furnace chamber is provided with means for observing the temperature in the various sections thereof, for instance, thermocouples as indicated at 53, and also means for observing the temperature of the inner wall of the furnace chamber as indicated at 54.

Because of the corrosive nature of the materials being handled, special care should be exercised in selecting the material from which the apparatus is fabricated. The inner wall 55 if the furnace chamber 36 is, with advantage, of low carbon nickel. The air jacket wall 56 may be fabricated of carbon steel. The upstream end of the furnace chamber is provided with a precast refractory lining 57, advantageously of alumina. To promote heat dissipation from the furnace chamber wall, to maintain the inner wall thereof at the desired low temperature, as previously described, we have, with advantage, provided on the outer surface of wall 55 a plurality of metal fins, not shown in the drawings, extending radially outwardly into the annular air zone of the cooling jacket.

A $SiF_4$ generator of the presently preferred type is represented in FIG. 8 of the drawings, and is constructed of a mild steel outer jacket 58 having a carbon brick inner lining as indicated at 59, and a lower grating 60 of Monel metal for supporting the crystalline silicon bed. A particularly suitable generator of this type is one having an inside diameter of 2′6″, and an over-all height of approximately 16½ feet, that portion of the chamber above the grating being approximately 13 feet in height. In operation, this chamber will normally be kept filled with the crystalline silica to a depth of about 10 to 12 feet, fresh silica being added to maintain the bed level. Manhole 61, which is, of course, closed during operation, is provided for entering the chamber to make repairs or inspection.

In the generator shown, the inner surface of the metal jacket was also lined with an acid resistant membrane. As an alternative, the interior of the vessel may be plated with silver or molybdenum.

A commercially available heat exchanger, which may be used with advantage as the acid vaporizer 8, is shown in FIG. 9 of the drawings. It is of the falling film type and comprises an outer metal jacket 62 provided internally with a plurality of horizontally extending baffles 63, supported by rods 63a, and a plurality of tubes 64 extending vertically between an upper tube sheet 65 and a lower tube sheet 66. The aqueous acid solution to be vaporized is charged into the chamber 67, overlying the upper tube sheet, through line 7 and overflows into the upper end of tube 64 and flows downwardly therethrough in heat exchange relation with steam charged to the evaporator through line 17, condensate passing off through line 18. Any unvaporized acid collected in chamber 68 beneath the lower tube sheet and is withdrawn therefrom through outlet 19 for recirculation through the evaporator. Acid vapors rise through the tubes and are discharged through outlet 9. This vaporizer contains nine ⅞ inch I.D. tubes each approximately 12 feet long, the inside diameter of the vaporizer being approximately 6 inches.

The outlet from the hydrolyzing unit 2 is connected through duct 69 with a cooler indicated at 70, whereby the furnace effluent may be reduced to the desired temperature, usually not lower than about 800° F., before being passed to the separating and collecting apparatus. Various types of indirect heat exchangers are available for this purpose. However, we prefer to use a cooler such as indicated in the drawings whereby air is blown by means of fan 71 over a plurality of tubes through which the furnace effluent passes, the air being exhausted to the atmosphere through outlet 72.

As previously indicated herein, we have, with advantage, separated the suspended silica from the furnace effluent gases by passing the suspension through an electric precipitator indicated at 74 and thence through duct 75 and series-connected primary and secondary cyclone separators 76 and 77. In the drawing, we have shown a further filter at 78 which may be of the bag filter type and to which the effluent gases carrying residual silica may be passed through duct 79. However, as noted elsewhere herein, the final filter 78 may frequently be dispensed with.

The necessary temperature, previously described, for preventing condensation and reversion of the reaction of Equation 2 in the collection system may be maintained by varying the extent of cooling in cooler 70 and the necessary temperature of the separated silica in the respective hoppers of the precipitator, cyclone separators, and filter may be maintained by means of electrical heating units indicated at 80.

By the method previously described, we have consistently converted at least 90% of the silicon tetrafluoride to pigmentary silica. Accordingly, the effluent gases from the separation system will consist primarily of products of combustion of the fuel gas with air, hydrogen fluoride resulting from the hydrolysis reaction, any unreacted $SiF_4$ and a large amount of excess water vapor. Depending upon whether the final filter 78 is used, the suspension will usually also contain more or less pigmentary silica.

Where the filter 78 is used, the gaseous mixture and any residual silica remaining therein is passed through line 81 to the absorber and fractionating column 82. Where the final filter is not employed, the mixture is passed from duct 79 directly to the column as indicated by broken line 81a. This column is, with advantage, of the bubble cap type comprising graphite bubble-cap plates and provided at its upper end with cooling coils indicated at 83, whereby the desired head temperature of the tower may be maintained to assure condensation of the desired proportion of water vapor for absorbing the hydrogen fluoride and minimize loss of HF in the stack gases. As the incoming gases pass upwardly through the descending water, any residual silica and $SiF_4$ therein will be converted to $H_2SiF_6$ by reaction with the hydrogen fluoride. Gases and uncondensed water vapor will be drawn from the upper end of the column through duct 84 by means of blower 85 and discharged to the stack.

Bubble-plate towers of the type indicated at 82 are well-known to the fractionating art and need not here be described in detail. We have, with particular advantage, used a bubble-plate tower containing 14 bubble trays and into which the effluent gases were introduced between the fourth and fifth tray from below. Other types of columns, for instance, filled columns, may be used but have been found less effective.

To effect the desired extent of concentration of the aqueous HF solution, the condensate is withdrawn from the lower end of column 82 through line 86 and passed through line 87 to reboiler 88 in which it is heated by indirect heat exchange with steam, advantageously at a pressure of approximately 50 p.s.i.g. passed to the reboiler through line 89, and the exhaust steam or condensate being withdrawn through line 90. The heated or vaporized condensate is returned to column 82 through line 87a.

Excellent results have been obtained, for instance, by maintaining the head temperature of the column at approximately 132° F. and the temperature of the condensate collecting in the lower end of the column at a temperature of approximately 234° F., the vapor feed to the column being approximately 300° F. Under these conditions, a constant boiling mixture containing in excess of 30% HF, by weight, and highly suitable for use in the generation of $SiF_4$ by our method is obtained.

As previously noted, the head temperature of the column may be maintained by a condenser, of conventional type, indicated at 83 to which cooling water is charged through line 91 and the heated water withdrawn through line 92.

By regulation of the head temperature of column 82, the amount of water passed off in the stack gases may be accurately controlled so as to retain the required amount of water in the system. Under the temperature conditions just described, one may obtain an aqueous acid solution of a concentration in excess of 30% and eminently suited for recycling to the acid vaporizer. It is preferred so to regulate the fractionation as to obtain a constant boiling HF solution.

As previously noted, any $SiO_2$ and unreacted $SiF_4$ present in the effluent gases will be converted to $H_2SiF_6$ in the column 82. Consequently, the recycled acid will usually contain an appreciable amount of $H_2SiF_6$. However, its presence does not impair the efficiency of our process since any $H_2SiF_6$ present in the recycled acid will be converted to $SiF_4$ and HF in the acid vaporizer.

For the reasons just stated, the final filter 78 may frequently be dispensed with, but when used its operating efficiency will be indicated by the proportion of $H_2SiF_6$ in the recycled acid.

Aqueous hydrofluoric acid, at the predetermined concentration, is continuously drawn from the storage chamber at the lower end of the absorber 82 and passed to the acid vaporizer at a rate controlled by a valve in line 7, advantageously automatically responsive to the pressure at the outlet of the $SiF_4$ generator, so as to maintain that pressure constant. An auxiliary valve 93 and circulating pump 94 are also shown in line 6.

Collected pigmentary silica is passed continuously from the hoppers of precipitatory 74, and cyclone separators 76 and 77, and filler 78 through the respective gas locks 95 to the pneumatic conveyor 96 and is passed therethrough to separator 97 wherein the pneumatic conveyor gas is separated from the silica and passed through line 98 into flue 79 by means of blower 99. Separated silica passes from the lower end of the separator into hopper 100 from which it passes through gas lock 101 into the feed hopper 102. From the lower end of the feed hopper, the silica is carried by a gas stream, air for instance, introduced through line 103 and conveyed through line 104 to the treater 105 for removal of residual HF and wherein the silica is heated to a temperature ranging from 500° F. to 1500° F., advantageously to a temperature of about 1300° F. The exhaust gases are withdrawn through line 107 and, if desired, introduced into column 82. The treated silica passes from the treater through chute 108 into the lower end of the elevator 109. From the upper end of the elevator, the silica passes through chute 110 into the receiving tank 111.

As the gaseous medium for conveying the silica through the pneumatic conveyor 96, we prefer to use hot air, advantageously air which has been preheated to about 700° to 800° F. This air is, with advantage, supplied by withdrawing hot air through line 112 from the furnace cooling jacket and passing it through air preheater 113 and thence through line 114 to pneumatic conveyor 96. Air for combustion is likewise advantageously drawn from the air cooling jacket through line 115 by means of blower 116 and forced thereby under pressure through valved connection 117 into chamber 44, as previously described.

The operation just described has been found to be highly efficient in the recovery of hydrogen fluoride for reuse. However, minor losses of HF from the system, and also excessive losses of water, may be made up by the introduction of fresh hydrofluoric acid and water as required, advantageously introduced into the condensate in the lower portion of absorber 82 through make-up line 118.

Though many variations in operational and apparatus details are possible within the scope of our invention, the following operation will serve to illustrate our invention and the efficiency thereof.

Before beginning the operation, the various elements of the apparatus should be purged of moisture and brought to operational temperatures. The $SiF_4$ generator should be charged with the crystalline silica, and the bed thereof preheated to operating temperatures, and an aqueous hydrofluoric acid solution at the desired concentration should be charged to the lower end of the absorber 82.

The various proportions, yields and losses experienced in this illustrative operation are set forth in the following Table I:

TABLE I

|  | HF, lbs./hr. | $H_2O$, lbs./hr. | $H_2SiF_6$ | $SiF_4$ lbs./hr. | Crystalline quartz, lbs./hr. |
|---|---|---|---|---|---|
| Recycle acid | 136.8 | 267.1 | 40.5 |  |  |
| Feed to acid vaporizer | 115.7 | 225.9 | 34.3 |  |  |
| Charge to $SiF_4$ generator from vaporizer | 125.2 | 225.9 |  | 24.8 |  |
| Generator quench | 21.1 | 41.1 | 6.3 |  |  |
| Total charge to $SiF_4$ generator | 146.3 | 267 | 6.3 | 24.8 | 105 |
| Charge to hydrolyzer | 14.8 | 327 |  | 202.6 |  |
| Output from hydrolyzer | 155.1 | 651.6 |  | 20.3 |  |
| Charge to absorber | 155.1 | 651.6 |  | 20.3 |  |
| Stack gases | 1.5 | 388.7 |  |  |  |
| Make-up | 1.5 | 1.0 |  |  |  |
| Output and recovery | 135.3 | 266.5 | 40.5 |  |  |

|  | Air, c.f.h. at 330° F. | Fuel gas, c.f.h. at 60° F. | $SiO_2$, lbs./hr. | $CO_2$, lbs./hr. | $N_2$, lbs./hr. | $O_2$, lbs./hr. |
|---|---|---|---|---|---|---|
| Charge to hydrolyzer | 70,500 | 6,800 |  |  |  |  |
| Output from hydrolyzer |  |  | 105.3 | 415 | 2,731.7 | 271 |
| Charge to absorber |  |  | 5.3 | 415 | 2,778.6 | 285.1 |
| Stack gases |  |  |  | 415 | 2,778.6 | 285.1 |
| Output and recovery |  |  | 100 |  |  |  |

In the foregoing example, fuel gas containing 470 B.t.u. per cubic foot was charged to the hydrolyzing unit at the rate of 6800 cubic feet per hour, both calculated at 60° F., and the reaction zone temperature was maintained at approximately 2400° F. The walls of the furnace chamber were maintained somewhat below 1200° F. by forcing cooling air through the furnace jacket. Effluent from the furnace chamber was at approximately 1800° F. and was cooled to about 800° F. before passing to the precipitator. In the separators, the temperature was not permitted to fall below 700° F. and the absorption column temperatures were as previously described. The charge to the $SiF_4$ generator was at 255° F. and the temperature of the effluent therefrom was 330° F.

The pigmentary silica recovered from the treater had a mean particle diameter of 15 millimicrons, as determined by the electron microscope, and analyzed 99.6% silica. Its surface area, as determined by the well-known B.E.T. (nitrogen adsorption) method, was 148 square meters per gram and its oil absorption characteristic, as determined by the Gardner method was 33.2 gallons of oil per 100 pounds of pigment. Its uncompressed bulk density was 1.1–1.5 pounds per cubic foot and its specific gravity was 2.11.

For illustrating its rubber compounding characteristics, the product was compounded with natural rubber according to the following recipe, the parts being by weight:

| | Parts |
|---|---|
| Rubber | 100 |
| $SiO_2$ pigment | 55 |
| Zinc oxide | 5 |
| Stearic acid | 3 |
| Antioxidant | 1.0 |
| Accelerator | 1.0 |
| Di-ortho-tolyguanidine | 1.6 |
| Sulfur | 3.0 |

The antioxidant used in the above recipe was phenyl-beta-naphthylamine marketed by R. T. Vanderbilt Company under the trade name "Agerite" and the accelerator was benzothiazyl disulfide marketed by the same company under the trade name "Altax."

The resultant rubber compound, after a 50-minute cure, had the following properties, as determined by conventional test methods:

| | |
|---|---|
| L-300 | 800 |
| Tensile strength | 3650 |
| Elongation | 635 |
| Rebound | 58.4 |

In operations similarly carried out, as herein prescribed, the silica product has been found to have the chemical and physical properties set forth in the following tabulation:

TABLE II

| | |
|---|---|
| Particular size range, millimicrons | 10–20 |
| Surface area (B.E.T. method), m.$^2$/gm. | About 150 |
| Silica content (moisture-free basis), percent | 99.8 |
| Iron oxide content (as $Fe_2O_3$), percent | 0.06 |
| Moisture loss at 105° C., percent | 0.0 |
| Moisture loss at 1000° C., percent | 0.3 |
| pH | 5 |
| Oil absorption (Gardner method), gallons/100 lbs. | About 30–35 |
| Bulk density, lbs./cu. Ft. | About 1–5 |

Our improved silica pigment is distinguished by its high chemical purity, extreme fineness, low water content, large external surface area and ease of dispersion in rubber and other media.

We claim:

1. Apparatus especially adapted for the production of pigmentary silica which comprises in sequence a hydrofluoric acid vaporizer, a vapor superheater for super heating the hydrofluoric acid vaporized in said vaporizer, a $SiF_4$ generator adapted to hold a vertically-elongated bed of crystalline silica, a hydrolyzer, a cooler, separator means adapted to the separation of suspended solids from gaseous media, and an absorption and fractionating column, means for conveying an aqueous acid condensate from the absorption and fractionating column to the vaporizer and thence through the superheater to the $SiF_4$ generator, means for conveying the resultant gas mixture from the generator to the hydrolyzer, ducts leading from the hydrolyzer to the cooler and thence to the separator means and conduit means for passing the gaseous medium from the separating means to the absorption and fractionating column.

2. Apparatus of claim 1 further characterized in that the hydrolyzer comprises an elongated, generally cylindrical furnace chamber tapered at its upstream end to a confined, coaxially-positioned throat section, a coaxially-positioned air chamber of cylindrical cross-section upstream from said throat section and tapering at its downstream end to the diameter of said throat section, an air duct opening tangentially into the cylindrical portion of the air chamber, at least one opening through the wall confining said throat section for the introduction of the gaseous mixture from the SiF$_4$ generator, a fuel gas injector extending coaxially through the air chamber into said throat section and adapted to be moved longitudinally for adjusting the position of the downstream end of said injector within the throat section.

3. The apparatus of claim 2 further characterized in that the fuel gas injector is closed at its downstream end and is provided adjacent its downstream end with radially-directed perforations.

4. The apparatus of claim 2 further characterized in that the wall delineating the throat section is perforated and is surrounded by an annular chamber and that means are provided for introducing the gaseous mixture tangentially into said annular chamber.

References Cited by the Examiner

UNITED STATES PATENTS

| | | | |
|---|---|---|---|
| 2,631,083 | 3/1953 | Engelson et al. | 23—82 X |
| 3,047,371 | 7/1962 | Krause et al. | 23—277 |

MORRIS O. WOLK, *Primary Examiner.*

JAMES H. TAYMAN, JR., *Examiner.*